United States Patent
Amaya et al.

(10) Patent No.: US 7,238,434 B2
(45) Date of Patent: Jul. 3, 2007

(54) WELDED STRUCTURE HAVING IMPROVED RESISTANCE TO STRESS CORROSION CRACKING

(75) Inventors: Hisashi Amaya, Kyoto (JP); Kazuhiro Ogawa, Nishinomiya (JP); Kunio Kondo, Sanda (JP); Masayuki Sagara, Nishinomiya (JP); Hiroyuki Hirata, Neyagawa (JP)

(73) Assignee: Sumitomo Metal Industries, Ltd., Osaka (JP)

( * ) Notice: Subject to any disclaimer, the term of this patent is extended or adjusted under 35 U.S.C. 154(b) by 0 days.

(21) Appl. No.: 11/366,442

(22) Filed: Mar. 3, 2006

(65) Prior Publication Data

US 2006/0201587 A1     Sep. 14, 2006

Related U.S. Application Data

(63) Continuation of application No. PCT/JP03/11360, filed on Sep. 5, 2003.

(51) Int. Cl.
  *B32B 15/04* (2006.01)
  *B32B 15/18* (2006.01)
  *C21D 9/08* (2006.01)
  *F16L 9/22* (2006.01)

(52) U.S. Cl. ............ 428/685; 428/34.1; 428/632; 138/142; 138/143; 148/325; 148/590; 148/592

(58) Field of Classification Search ......... 428/681, 428/685, 667, 632, 633, 702, 34.1; 137/140, 137/141, 142, 143, 145; 148/590, 592, 605, 148/325; 138/140, 141, 142, 143, 145

See application file for complete search history.

(56) References Cited

U.S. PATENT DOCUMENTS 5,275,893 A * 1/1994 Miyasaki et al. ........... 428/683

FOREIGN PATENT DOCUMENTS

| JP | 07-179943 | 7/1995 |
|----|-----------|--------|
| JP | 08-132238 | 5/1996 |
| JP | 11-291084 | 10/1999 |
| JP | 2000-015447 | 1/2000 |

OTHER PUBLICATIONS

M. Ueda et al., "Corrosion Resistance of Weldable Super 13CR Stainless Steel in $H_2S$ Containing $CO_2$ Environments", Corrosion 96—The NACE International Annual Conference and Exposition, Paper No. 58, copyright 1996, no month.

* cited by examiner

*Primary Examiner*—Michael E. Lavilla
(74) *Attorney, Agent, or Firm*—Clark & Brody

(57) ABSTRACT

This invention relates to a welded line pipe structure for transporting corrosive petroleum or natural gas. It is constituted by martensitic stainless steel pipes containing 8–16% Cr and at most 0.05% C. By suitably controlling the welding conditions at the time of girth welding of the steel pipes so as to ensure that the Cr concentration in grain boundary Cr-depleted portions existing immediately beneath a weld oxide scale is at least 5%, the occurrence of SCC in a high temperature $CO_2$ environment can be prevented.

16 Claims, 3 Drawing Sheets

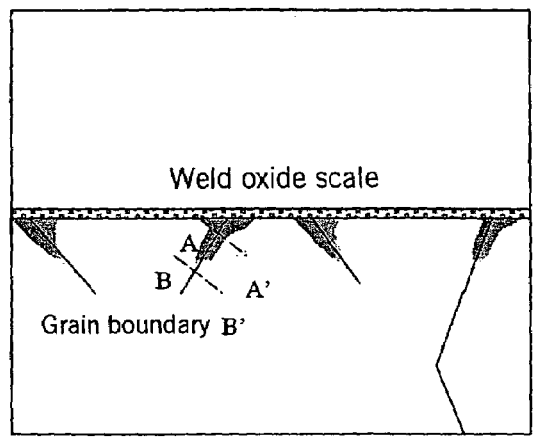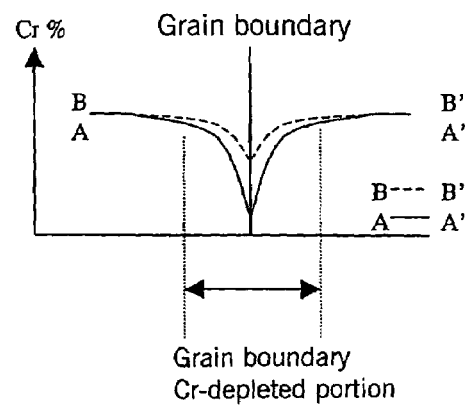
*Fig. 3(a)*  *Fig. 3(b)*
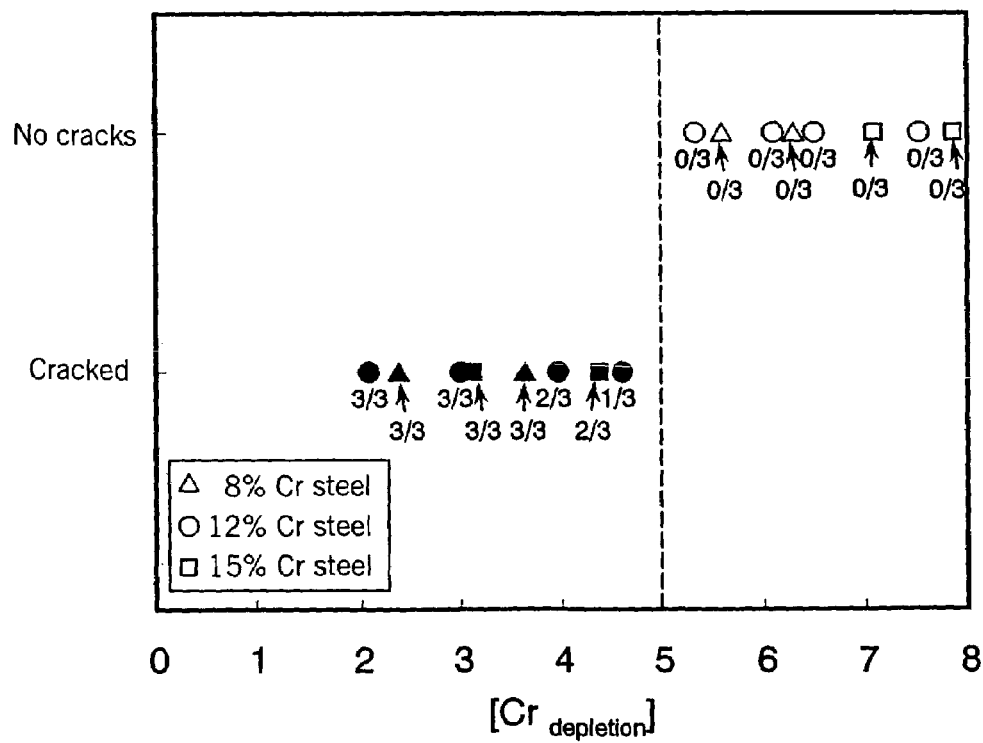
*Fig. 4*

Girth weld

WELDED STRUCTURE HAVING IMPROVED RESISTANCE TO STRESS CORROSION CRACKING

This application is a continuation of International Patent Application No. PCT/JP2003/011360 filed Sep. 5, 2003. This PCT application was not in English as published under PCT Article 21(2).

TECHNICAL FIELD

This invention relates to a welded structure having improved resistance to stress corrosion cracking. More particularly, it relates to a welded structure including a welded joint for martensitic stainless steel pipes for use in pipelines for transporting fluids, such as petroleum and natural gas, which are corrosive with respect to metals.

BACKGROUND ART

Petroleum and natural gas produced by oil fields and gas fields contain corrosive gases such as carbon dioxide ($CO_2$, carbonic acid gas) and hydrogen sulfide ($H_2S$) as associated gases, so they are corrosive with respect to metals. Accordingly, excellent corrosion resistance is required of steel materials used in pipelines for transporting fluids, such as petroleum and natural gas, having this high corrosiveness. Typical examples of such corrosion include uniform (general) corrosion, sulfide stress cracking (SSC), and stress corrosion cracking (SCC).

For uniform corrosion, it is known that the addition of Cr to steel is effective at decreasing the corrosion rate. Therefore, in a high temperature environment containing carbon dioxide, the countermeasure of increasing the Cr content of steel has been taken. A specific example of a material having excellent resistance to such corrosion is a martensitic stainless steel such as 13 Cr steel.

However, with martensitic stainless steel, SSC sometimes occurs in an environment containing a minute amount of hydrogen sulfide. For such corrosion, from in the past, it has been known that resistance to SSC in an environment containing hydrogen sulfide can be improved by adding a suitable amount of Mo and Ni to steel to stabilize a corrosion resistant film formed on the surface of the steel. It is also known that the resistance to SSC of welded joints can be improved by using a low C martensitic stainless steel in which the C content of the base metal is decreased with the object of suppressing an increase in hardness in the heat affected zones (HAZ) of welds which decrease resistance to SSC (see Corrosion/96 No. 58).

It has been thought that a low C martensitic stainless steel generally has low susceptibility to SCC. This is because SCC is thought to be sensitized by the formation of a Cr-depleted zone caused by the formation of Cr carbides, and it is more difficult for a Cr-depleted zone to form with a low C martensitic stainless steel than with an austenitic stainless steel. In fact, up to now, it has been thought that SCC does not take place with a low C martensitic stainless steel in a high temperature carbon dioxide environment, i.e., an environment with a high temperature on the order of 80–200° C. and containing chloride ions and carbon dioxide ($CO_2$) and which is also referred to as a sweet environment (referred to below simply as a "high temperature $CO_2$ environment").

Even with a martensitic stainless steel, as described, for example, in paragraph 0008 of JP-A 07-179943 (1995), if C is added in excess of 0.05%, a Cr-depleted zone is formed resulting from the formation of a large amount of Cr carbides, and the resistance to corrosion by carbon dioxide deteriorates. Therefore, SCC referred to in this specification is of course premised on a C content of at most 0.05%.

DISCLOSURE OF THE INVENTION

Recently, it has been reported that SCC occurs in the welded joints of low C martensitic stainless steel and specifically in the heat affected zones (HAZ) of girth welds on the inner surface of steel pipes.

In line pipes for transporting natural gas or petroleum, it is important to prevent uniform corrosion which causes a decrease in wall thickness. However, with SCC and SSC, it takes a short time for cracks caused by corrosion to progress and pass through the wall thickness, and as these types of corrosion are localized phenomena. Therefore, they result in a more severe problem than uniform corrosion.

Even with a low C martensitic stainless steel, the cause of SCC had been thought to reside in the presence of a Cr-depleted zone. However, when it was attempted to confirm this experimentally, it was found that the presence of a known Cr-depleted zone was not the cause.

The present inventors found that the occurrence of SCC in a low C martensitic stainless steel like that described above is a completely new phenomenon. They performed detailed investigations of the phenomenon of SCC which occurs in a HAZ of a low C martensitic stainless steel in a high temperature $CO_2$ environment, and they made the following findings.

(1) Cracks due to SCC occur in an as-welded surface, but such cracks no longer occur if the inner surface layer of a welded joint of a steel pipe is removed by pickling or mechanical grinding.

(2) When girth (circumferential) welding of a steel pipe is carried out while the shielding conditions of the inner surface of the pipe are varied in order to vary the extent to which a weld oxide scale (oxide scale formed by welding) is formed, the less formation of a weld oxide scale occurs, the smaller is the frequency of occurrence of SCC.

Based on these findings, it was found that the surface layer of the inner surface of a steel pipe in the heat affected zone of a girth weld of the steel pipe greatly contributes to SCC in a high temperature $CO_2$ environment.

As a result of further investigations, the following were found as reasons why the heat affected zone influences the occurrence of SCC.

(1) Minute Cr-depleted portions exist in the grain boundaries within the HAZ texture immediately beneath the weld oxide scale which is formed in the heat affected zone of the inner surface of a steel pipe.

(2) The initiating point of SCC is located in these Cr-depleted portions which exist in the surface layer of the heat affected zone in the vicinity of the inner surface of the steel pipe.

(3) Whether SCC occurs depends upon the lowest concentration of Cr in the Cr-depleted portions.

(4) The weld oxide scale which is formed at the time of welding is a cause of the formation of the Cr-depleted portions.

(5) The welding conditions are related to the formation of the Cr-depleted portions immediately beneath the weld oxide scale.

The Cr-depleted portions which were found in the present invention differ from a conventional Cr-depleted zone with respect to features such as the area of formation and the cause of formation. In the present specification, they are called "SCC-inducing grain boundary Cr-depleted portions caused by a weld oxide scale" and will be referred to below simply as "grain boundary Cr-depleted portions".

This invention is based on these findings, and in its broadest sense, it is a welded structure made of a low C martensitic stainless steel which contains at most 0.05% C and 8–16% Cr wherein the lowest Cr concentration in the grain boundary Cr-depleted portions which exist immediately beneath the weld oxide scale in the heat affected zone of a weld is at least 5 mass percent.

More specifically, the present invention is a welded line pipe structure made of a low C martensitic stainless steel which contains at most 0.05% C and 8–16% Cr, wherein the line pipe is made by girth welding of steel pipes and the lowest Cr concentration in grain boundary Cr-depleted portions existing immediately beneath a weld oxide scale in the heat affected zone of a weld is at least 5 mass percent.

From another standpoint, the present invention is a method of manufacturing a welded structure by carrying out girth welding such that the lowest Cr concentration in grain boundary Cr-depleted portions formed immediately beneath a weld oxide scale in a heat affected zone of a weld is at least 5 mass percent.

According to the present invention, SCC can be effectively obstructed. Accordingly, from still another standpoint, the present invention is a method for preventing SCC of a welded structure which is used in a high temperature $CO_2$ environment by ensuring that the lowest Cr concentration in grain boundary Cr-depleted portions which exist immediately beneath a weld oxide scale in the heat affected zone of a weld is at least 5 mass percent.

According to the present invention, a line pipe made by girth welding can be used in an as-welded state, thereby greatly facilitating field (site) welding. Thus, the present invention has great significance in practical use.

BRIEF DESCRIPTION OF THE DRAWINGS

FIG. 3(a) is a schematic explanatory view of grain boundary Cr-depleted portions which were first discovered by the present invention, and FIG. 3(b) is a graph showing the distribution of Cr concentration in a region along line A–A' and line B–B' in FIG. 3(a).

FIG. 4 is a graph showing the relationship between $Cr_{depletion}$ defined in the present invention and the frequency of occurrence of cracking of welded joints in a high temperature $CO_2$ environment, wherein $Cr_{depletion}$ indicates the lowest Cr concentration in the grain boundaries immediately beneath the weld oxide scale in the HAZ of a weld.

BEST MODE FOR CARRYING OUT THE INVENTION

Next, in order to accurately understand the phenomenon of formation of grain boundary Cr-depleted portions which were first discovered in the present invention, investigations concerning the phenomenon of formation of a Cr-depleted zone which was known in the prior art will be described.

Figure 1A:
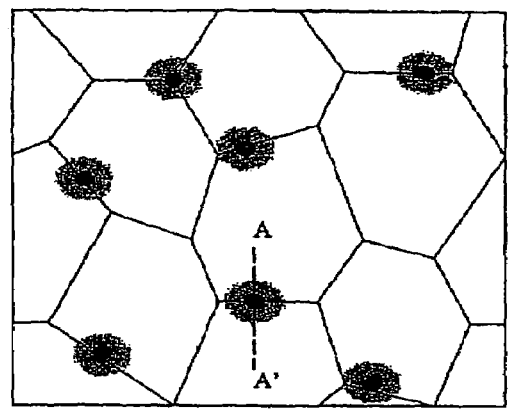
FIG. 1(a) is an explanatory view schematically showing the state of formation of a conventional Cr-depleted zone resulting from the formation of Cr carbides.
Figure 1B:
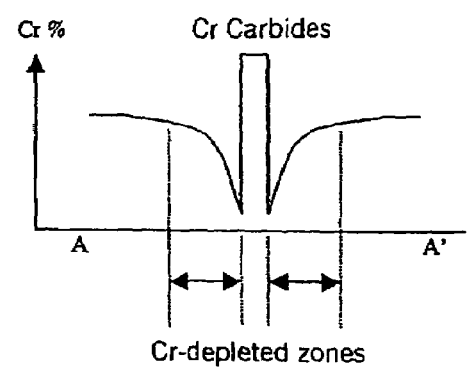
FIG. 1(b) is a graph showing the distribution of the Cr concentration in a region along line A–A' in FIG. 1(a).

FIG. 1(a) is an explanatory view schematically showing the state of formation of a Cr-depleted zone resulting from the formation of Cr carbides, and FIG. 1(b) is a graph showing the distribution of Cr concentration in a region along line A–A' in FIG. 1(a).

As can be seen from FIG. 1(a) and FIG. 1(b), the C and Cr contained in the base metal composition react to form Cr carbides, and thus in the periphery of the resulting Cr carbides, regions in which the Cr concentration is decreased are formed. These regions becomes Cr-depleted zones formed as a result of the formation of Cr carbides. In view of the fact that they are found particularly numerously in the vicinity of grain boundaries, they are sometimes called grain boundary Cr-depleted zones. However, for convenience, in the present specification they will be referred to as carbide-induced Cr-depleted zones. In general, it is thought that there is less formation of these carbide-induced Cr-depleted zones with martensitic stainless steel than with austenitic stainless steel. Since the speed of diffusion of Cr in martensite (having a bcc structure) is considerably greater than the speed of diffusion of Cr in austenite (having an fcc structure), it has been thought that Cr is supplied fairly quickly from the matrix of a martensitic stainless steel and thus a carbide-induced Cr-depleted zone does not form in such a steel.

Figure 2A:
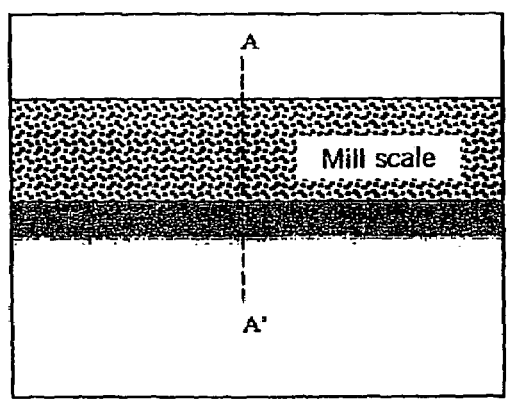
FIG. 2(a) is an explanatory view schematically showing the state of formation of a conventional Cr-depleted zone (layer from which Cr was removed or dechromized layer) resulting from the formation of mill scale.
Figure 2B:
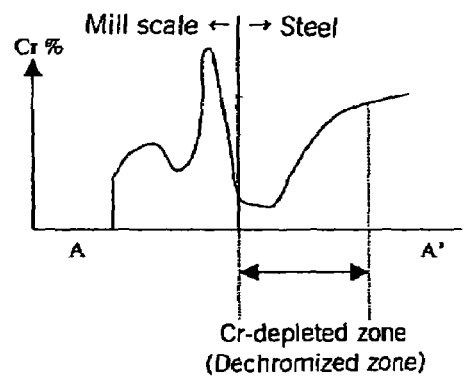
FIG. 2(b) is a graph showing the distribution of the Cr concentration in a region along line A—A in FIG. 2(a)'.

FIG. 2(a) is an explanatory view schematically showing the state of formation of a Cr-depleted zone (a dechromized layer) resulting from the formation of mill scale, and FIG. 2(b) is a graph showing the distribution of the Cr concentration in a region along line A–A'.

As shown in FIG. 2(a) and FIG. 2(b), an oxide layer referred to as mill scale is formed during the steps of hot rolling or heat treatment in a manufacturing process of a steel material. This oxide layer contains spinel and other Cr-containing substances. Therefore, along the interface between the mill scale and the base metal, a layer-like region having a reduced Cr concentration is formed on the base metal side of the interface. This is a Cr-depleted zone resulting from the formation of mill scale. In the present specification, for convenience, this Cr-depleted zone will be referred to as a mill scale-induced Cr-depleted zone.

The effects of the presence of these two types of conventional Cr-depleted zones on the occurrence of SCC found in the above-described HAZ were considered. Since it is thought that the mill scale-induced Cr-depleted zone caused by the formation of mill scale is not directly related to SCC occurring in the heat affected zone, the relationship between a carbide-induced Cr-depleted zone caused by carbide formation and the occurrence of SCC in a high temperature $CO_2$ environment was investigated.

Steel A (12Cr-5Ni-1Mo) having C content of 0.05% (mass percent) and Steel B (12Cr-5Ni-1Mo) having C content of 0.003% were prepared in a laboratory, and subjected to quenching-tempering treatment. The C content of these steels was varied in order to intentionally vary the extent of formation of Cr carbides. Welded joints were prepared using these two steel materials. With Steel A, formation of Cr carbides was ascertained in the HAZ along the grain boundaries, but with Steel B, the formation of Cr carbides was not observed.

Test pieces of these welded joints were used to investigate the occurrence of SCC in a high temperature $CO_2$ environment. As a result, for each test piece, regardless of whether carbides were formed or not, cracks occurred when the inner surface was in an as-welded state, while cracks did not occur when the inner surface underwent grinding. Thus, it was confirmed that the occurrence of cracks depends on the surface condition of the weld and is not influenced by the presence of a carbide-induced Cr-depleted zone formed within the steel texture, or in other words that cracking does not occur even if a carbide-induced Cr-depleted zone is present.

Accordingly, the grain boundary Cr-depleted portions which were found in the present invention differ from a carbide-induced Cr-depleted zone with respect to features such as the area of formation and the cause of formation.

FIGS. 3(a) and 3(b) are schematic explanatory views of grain boundary Cr-depleted portions which were first found by the present invention. As shown in FIG. 3(a), grain boundary Cr-depleted portions are formed along the grain boundaries of the base metal concomitantly with the formation of a weld oxide scale. This formation of the grain boundary Cr-depleted portions occurs along the prior γ grain boundaries, and as the distance from the weld oxide scale layer increases, the Cr concentration approaches that of the base metal. Thus, the formation of the weld oxide scale causes Cr depletion, which progresses along the prior γ grain boundaries in the base metal texture immediately beneath this very thin weld oxide scale, and cracking takes place from such Cr-depleted portions serving as an initiating point.

The formation of Cr-depleted portions in the grain boundaries immediately beneath a weld oxide scale was first discovered in the present invention. In the past, it was not known that the formation of an extremely thin oxide scale at the time of welding is accompanied by the formation of Cr-depleted portions in the grain boundaries.

The presence of Cr-depleted portions or regions as explained above with respect to FIG. 3(a) and FIG. 3(b) was found by observation with a TEM (transmission electron microscope) of the vicinity of the surface layer in the HAZ of a welded joint produced by girth welding of a steel pipe, i.e., of the texture of the base metal immediately beneath the weld oxide scale.

From the results of observation with a TEM and from the fact that SCC behavior in an actual welded joint depends on the condition of the surface layer, it was found that the grain boundary Cr-depleted portions formed immediately beneath the weld oxide scale of a girth weld of a steel pipe serve as initiating points for SCC in a high temperature $CO_2$ environment.

FIG. 4 is a graph showing the relationship between $Cr_{depletion}$, which is the lowest Cr concentration in the grain boundary Cr-depleted portions, and the frequency of occurrence of cracking in a high temperature $CO_2$ environment.

The data in FIG. 4 are the results of SCC tests on martensitic stainless steels containing 8%, 12%, or 15% Cr and at most 0.05% C. The data are the results for tests using three test pieces of each steel. The numbers in the figure indicate (number of test pieces in which SCC occurred)/(number of test pieces).

As can be seen from the results in FIG. 4, SCC occurs when the lowest Cr concentration ($Cr_{depletion}$) in the grain boundaries immediately beneath the weld oxide scale is less than 5%. The lower is the value of $Cr_{depletion}$, the more frequent is the occurrence of cracking.

It can be presumed that the reason why the frequency of occurrence of cracking increases (that cracking occurs more easily) as the value of $Cr_{depletion}$ decreases is that it becomes easy for dissolution (corrosion) to occur in the grain boundary Cr-depleted portions in the above-described corrosive environment. Namely, SCC occurring in a high temperature carbon dioxide environment is caused by so-called active path corrosion (APC). Therefore, it is thought that the lower the concentration in the grain boundary Cr-depleted portions, the more corrosion is promoted in the grain boundary Cr-depleted portions during the initial stage of corrosion, leading to a macroscopic phenomenon of cracking.

It was confirmed by investigation that the region in which the grain boundary Cr-depleted portions are formed immediately beneath the weld oxide scale extends from the toe portions in the reinforcement part of a weld to the heat affected zone (HAZ) of the weld.

Namely, with a low C martensitic stainless steel containing 8–16% Cr and at most 0.05% C, a welded joint in which SCC does not occur in a high temperature $CO_2$ environment has a value of $Cr_{depletion}$ of at least 5%, wherein $Cr_{depletion}$ is the lowest Cr concentration in the grain boundary Cr-depleted portions formed immediately beneath the weld oxide scale in a region extending from the toe portion in the reinforcement part of a weld to the HAZ thereof.

Such a surface condition having a value of $Cr_{depletion}$ which is at least 5% can be obtained by controlling the cooling rate and the amount of oxygen in the surface layer of the HAZ on the so-called penetration bead side, which is the opposite side from the side on which an arc is generated at the time of welding. Namely, the formation of grain boundary Cr-depleted portions which takes place in the surface layer of the HAZ on the inner surface side is due to the fact that the surface of the HAZ oxidizes at the time of welding to form a scale, thereby causing Cr present immediately beneath the scale to diffuse from the grain boundaries. Therefore, the formation depends both on the holding time in the temperature range in which Cr can diffuse, i.e., the cooling rate of the surface layer of the HAZ, and on the amount of supplied oxygen for forming the scale.

In addition to the cooling rate of the HAZ surface layer and the amount of oxygen, the amount of heat input, the interpass temperature, and the size of a single pass have an influence on the formation of the grain boundary Cr-depleted portions in a complicated manner, so these parameters may also be suitably controlled.

Normally, in MAG (metal argon gas) welding, when high alloy steel pipes are welded together by one-side welding so as to form a penetration bead, a backing strip made of copper or a copper alloy is used in order to prevent burn-through or melt down. In this case, the oxygen concentration of the welding atmosphere may be suitably controlled, even in the case of using a usual copper backing strip, by coating the copper surface of the backing strip with a ceramic coating such as $Al_2O_3$ and passing Ar gas on the reverse side of the bead.

Next, the reasons for the range of each of the constituent elements in a preferred composition of a steel used as a base metal in the present invention will be described. In this specification, unless otherwise specified, percent with respect to a steel composition means mass percent.

C: 0.001–0.05%

C is an element which forms carbides with elements such as Cr and decreases corrosion resistance in a carbon dioxide environment. It is also an element which decreases weldability. Therefore, its content is preferably as low as possible, and the upper limit is 0.05%. The lower limit is 0.001% in view of the range in which carbon content can be practically controlled. Preferably its content is 0.003–0.02%.

Si: 0.05–1%

Si is an element which is added as a deoxidizing agent during a refining process of steel. Its content may be the same as the amount to which it is restricted in ordinary stainless steel, which is at most 1%. In order to obtain the above-described effect, its content is at least 0.05%. Preferably it is 0.1–0.7%.

Mn: 0.05–2%

Mn is an element which improves hot workability. In order to obtain this effect, its content is at least 0.05%. If the Mn content exceeds 2%, it becomes easy for Mn to segregate inside an ingot, and this segregation tends to bring about deterioration in toughness and deterioration in resistance to SSC in a $H_2S$ environment. Therefore, the Mn content is 0.05–2%. Preferably it is 0.1–1.5%. More preferably it is 0.2–1.0%.

Cr: 8–16%

Cr is an essential element for exhibiting corrosion resistance in a carbon dioxide environment. Its content is at least 8% in order to obtain corrosion resistance in a high temperature carbon dioxide environment. However, Cr is a ferrite forming element, and in the case of a martensitic stainless steel, if an extremely large amount of Cr is added, hot workability worsens due to the formation of δ ferrite. Therefore, the Cr content is 8–16%.

Ni: 0.1–9%

In addition to the effect of increasing corrosion resistance, Ni has the effect of increasing toughness, and, Ni is added in an amount of up to 9% as required. In order to exhibit these effects, at least 0.1% Ni is added. However, Ni is an austenite forming element, and if a large amount thereof is included, a retained austenite phase is formed, thereby decreasing strength and toughness, so the upper limit of Ni is 9%. Preferably its content is 0.5–7%. More preferably it is 1–6%.

Sol. Al: 0.001–0.1%

Al is an element which is added as a deoxidizing agent during a refining process of steel. In order to obtain this effect, its content is at least 0.001%. If its content is in excess of 0.1%, a large amount of alumina inclusions are formed, which leads to a decrease in toughness, so the upper limit of Al is 0.1%. Preferably its content is 0.005–0.05%.

In the same manner as with ordinary stainless steel, the amount of unavoidable impurities such as P, S, N, and O are preferably as small as possible since they worsen corrosion resistance and toughness.

In the present invention, there are no particular limits on P, S, and N as long as they are included as impurities, but normally, the contents thereof are preferably at most 0.030% for P, at most 0.010% for S, and at most 0.015% for N.

A martensitic stainless steel according to the present invention may also contain one or more of the following optional elements.

Mo, W: 0.1–7% each

In the presence of Cr, Mo and W have the effect of improving resistance to pitting and resistance to sulfide cracking. If necessary, either or both of these elements may be added in an amount of 0.1–7% each. When these elements are added with the object of improving corrosion resistance, the value of Mo+0.5 W is preferably at least 0.1%. On the other hand, if the value of Mo+0.5 W exceeds 7%, it leads to formation of a ferrite phase and hot workability is decreased, so the upper limit is 7%.

Cu: 0.1–3%

Cu has an effect of decreasing the dissolution rate in a low pH environment. When it is added, its content is preferably in the range of 0.1–3%. However, addition of Cu results in the problem of Cu checking, so it is preferable to determine the content thereof taking into consideration the balance with Ni.

Ti, Zr, Hf, V, and Nb: 0.005–0.5% each

Ti, Zr, Hf, V, and Nb can fix C and suppress the formation of Cr carbides, and they have the effect of suppressing the occurrence of localized corrosion caused by a Cr-depleted zone in the periphery of Cr carbides. Therefore, if necessary, at least one of these elements can be added. When added, the content of each is preferably 0.005–0.5%.

Ca, Mg, and REM: 0.0005–0.01% each

One or more of Ca, Mg, and REM may be added with the object of improving the hot workability of steel. At least one can be added in the range of 0.0005–0.01% each.

Next, a method of manufacturing a welded structure according to the present invention will be described.

A typical example of a welded structure which is the subject of the present invention is a line pipe having a welded joint formed by girth welding and in particular a line pipe made from seamless steel pipes. The welding operation is carried out in the following manner.

Figure 5A:
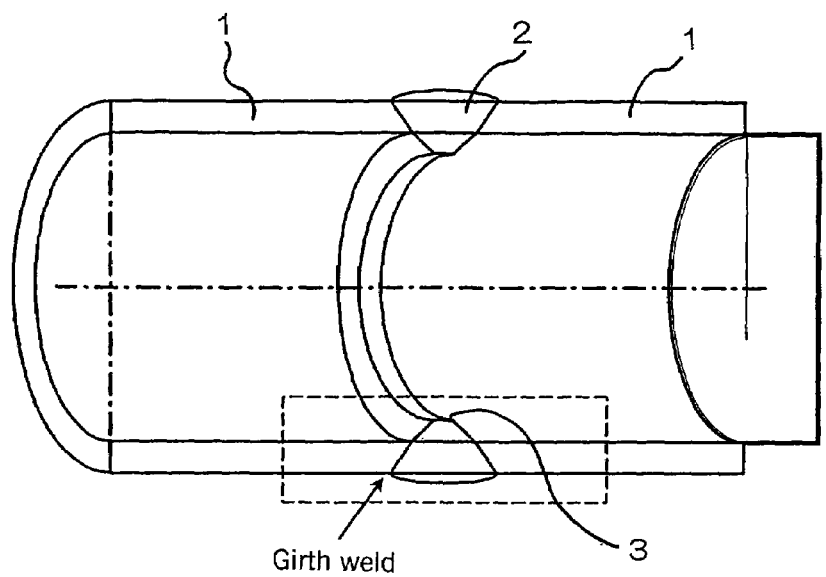
FIG. 5(a) is a schematic explanatory view of the procedures in girth welding of pipes.

As shown in FIG. 5(a), steel pipes 1, 1 having beveled edges for welding are abutted, and multiple pass girth welding is carried out from the outer side of the steel pipe to form a girth weld 2. Although the welding material somewhat may vary depending on the type of steel constituting the steel pipes and the welding method to be employed, generally it can be one used in the welding of martensitic stainless steel, and in the present invention, there are no particular restrictions on it. There are also no particular restrictions on the welding method itself. For example, it can be either conventional TIG (tungsten inert gas) or MAG arc welding.

According to the present invention, the resulting weld has sufficient resistance to SCC in an as-welded state. Therefore, it is not always necessary to perform treatment such as grinding of the inner surface 3 of the weld. On the contrary, it is preferable not to carry out such treatment in the case of field welding. Post heat treatment is not necessary either. Accordingly, the present invention becomes particularly useful in the case of manufacture of a welded structure by field welding such as a welded joint structure of a line pipe. Post heat treatment after the completion of welding may of course be carried out if necessary, and there are no particular restrictions thereon.

Figure 5B:
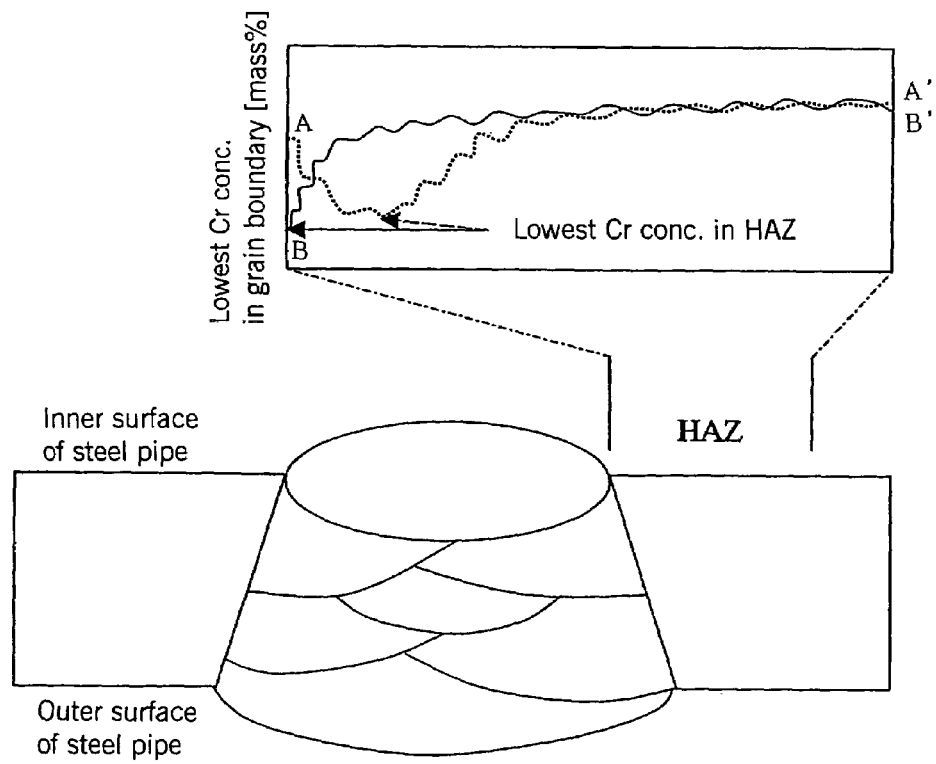
FIG. 5(b) is a schematic explanatory view of a multilayer pass (multi-pass) in a welded joint, which is accompanied by a graph schematically showing the distribution of the Cr concentration in the heat affected zone.

FIG. 5(b) is a schematic explanatory view of a weld and a HAZ. It also shows the variation in the lowest Cr concentration in the grain boundaries in the HAZ. The solid line and the dashed line schematically show the variation in the Cr concentration at a depth of 100 nm into the base metal immediately beneath the weld oxide scale in the HAZ on the inner surface of a welded steel pipe. As explained in the examples, measurement of the Cr concentration in the grain boundary Cr-depleted portions is carried out in the grain boundaries at a depth of 100 nm into the base metal immediately beneath the weld oxide scale, and it is measured in the direction perpendicular to the grain boundaries to determine the lowest Cr concentration in the profile obtained by measurement.

Depending upon the conditions at the time of welding, a profile such as the profile A–A' depicted by a dotted line is obtained in some cases, and a profile such as the profile B–B' depicted by a solid line is obtained in other cases. In either case, the "lowest Cr concentration in the HAZ" is determined at the point having the lowest concentration in the profile of the Cr concentration in the grain boundaries from the toe portion of the reinforcement part of the weld towards the HAZ.

According to the present invention, in order to ensure that a welded joint does not cause SCC in a high temperature $CO_2$ environment, $Cr_{depletion}$, which is the lowest Cr concentration in the grain boundary Cr-depleted portions immediately below the weld oxide scale in the HAZ region from the toe portion of the reinforcement part of the weld to the end of the HAZ thereof, satisfies $Cr_{depletion} \geq 5\%$.

$Cr_{depletion}$ is the lowest Cr concentration in the grain boundary Cr-depleted portions which are formed immediately beneath the weld oxide scale in the HAZ. The position in which the $Cr_{depletion}$ exists may be in the vicinity of the toe portion of the reinforced weld in some cases or in a location somewhat removed therefrom in other cases. It is preferable to previously ascertain the distribution of Cr concentration in the horizontal direction in the HAZ. The mechanism by which such a variation in distribution of Cr concentration appears is not clear, but it is presumed that the effect on oxidation of reheating which is performed during multiple pass welding varies with the position, thereby causing the position which is most susceptible to oxidation and thus to Cr depletion to vary.

As for the distribution of the Cr concentration in the wall thickness direction from immediately beneath the inner surface layer, it is thought that the closer a position is to the weld oxide scale, the lower is its Cr concentration. In order to make it possible to determine the Cr concentration by TEM adequately and practically, the Cr concentration is defined as the value measured in the grain boundary areas at a depth of 100 nm in the thickness direction from immediately beneath the oxide scale.

When manufacturing a welded structure according to the present invention, a preferred welding method to inhibit the formation of grain boundary Cr-depleted portions is as follows.

(1) The amount of oxygen in the welding atmosphere is decreased. This suppresses the formation and growth of an oxide scale.

(2) As another method, the speed of cooling after welding is increased such that the residence time in the temperature region in which an oxide scale is formed is made as short as possible. Alternatively, the cooling rate may be made slow adequately. In this case, grain boundary Cr-depleted portions are formed with the growth of the oxide scale, but they restore their Cr concentration by diffusion of Cr which takes place from the matrix towards the grain boundary Cr-depleted portions.

(3) As yet another method, the amount of heat input at the time of welding can be reduced, or it can be made sufficiently large. The amount of heat input is a parameter which affects the cooling rate, and for the same reasons as for the cooling rate, it affects the formation of an oxide scale and the restoration of Cr concentration in the grain boundary Cr-depleted portions.

(4) The grain boundary Cr-depleted portions may be eliminated by adjusting the interpass temperature. In this case, if the interpass temperature is in a range in which oxidizing rate is sufficiently low, restoration of Cr concentration in the grain boundary Cr-depleted portions due to diffusion of Cr from the matrix can be expected. Therefore, the interpass temperature is preferably set to as high a temperature as possible in a temperature range in which oxidation of the surface of the HAZ does not take place.

Thus, in order to control the formation of grain boundary Cr-depleted portions, there is the concept of not forming grain boundary Cr-depleted portions from the start, and the concept of, once they are formed, restoring the Cr concentration in the grain boundary Cr-depleted portions so as to end up decreasing the number of such portions. Various means are conceivable for this purpose.

Next, the effects of the present invention will be more concretely described by means of examples.

EXAMPLES

Ingots of martensitic stainless steels having the chemical compositions shown in Table 1 were prepared, and steel plates having a width of 100 mm and a thickness of 12 mm were obtained therefrom by usual hot rolling and cold rolling. For each of the resulting steel plates, a pair of steel plates were abutted for welding so as to form a V-shaped groove with a groove angle of 15°. Using a welding material made of a dual-phase stainless steel (a 25Cr-7Ni-3Mo-2W steel) inserted into the groove, multilayer welding was carried out by MAG welding or TIG welding from one side by the below-described method while controlling the welding atmosphere on the penetration bead side, and welded joints were formed which differed with respect to the condition of the surface layer in the HAZ on the root pass side.

In MAG welding, in order to retain molten metal against the force of gravity, a copper plate with a width of 25 mm and a thickness of 8 mm and having a groove in the direction of the welding line with a width of 5 mm and a depth of 2 mm was placed as a backing strip on the rear side of the groove to be welded, and a shield box was disposed on the outer side of the copper plate to provide a closed space. The closed space had various oxidizing atmospheres which were prepared either without a shield gas (namely, using atmospheric air, i.e., 20 volume percent of oxygen) or by supplying a mixed gas of argon and oxygen with a varying oxygen concentration at a flow rate of 25 $cm^3$ per minute. The oxygen concentration in the oxidizing gas was measured with an oxygen meter.

The copper plate which was used as a backing strip was either a plain copper plate or a copper plate coated with alumina (to a thickness of 1 mm), and the results for the two were compared.

In TIG welding, the oxygen concentration in the welding atmosphere on the penetration bead side was controlled by covering a portion parallel to the weld line and having a width of 60 mm centered on the rear side groove with a copper shield box forming a closed space with a gap having a height of 20 mm from the steel plate and supplying a mixed gas of argon and oxygen having various oxygen concentrations to the inside of the box at a flow rate of 25 $cm^3$ per minute so as to form various oxidizing atmospheres in the box. The oxygen concentration in the oxidizing atmosphere was measured with an oxygen meter.

An SCC test piece having a thickness of 2 mm, a width of 10 mm, and a length of 75 mm was taken from the root pass side of the resulting welded joint so as to include the weld bead and the weld oxide scale on the surface and so as to have a side measuring 75 mm in the direction parallel to the weld line, and it was subjected to an SCC test which was carried out under the corrosion test conditions shown in Table 2. The test results are compiled in Table 3.

comparative example in which the lowest Cr concentration in the grain boundary Cr-depleted portions which were formed with the formation of a weld oxide scale was low, $Cr_{depletion}$ was less than 5%, and SCC occurred.

In these examples, the present invention was explained with respect to welding of plates, but it will be clear to those skilled in the art from the proceeding explanation that the same applies when carrying out welding of steel pipes.

TABLE 1

| | C | Si | Mn | P | S | Cr | Ni | Mo | W | sol. Al | N | Cu | Ti | Zr | Hf | V | Nb | Ca | Mg | REM |
|---|---|---|---|---|---|---|---|---|---|---|---|---|---|---|---|---|---|---|---|---|
| A | 0.01 | 0.2 | 0.4 | 0.021 | 0.001 | 9.3 | 4.1 | — | — | 0.002 | 0.008 | — | — | — | — | — | — | — | — | — |
| B | 0.008 | 0.21 | 0.37 | 0.019 | 0.001 | 11.9 | 5.8 | 2.1 | — | 0.025 | 0.007 | — | — | — | — | — | — | — | — | — |
| C | 0.011 | 0.25 | 0.28 | 0.018 | 0.001 | 12.9 | 6.5 | 1.9 | 0.5 | 0.020 | 0.008 | 1.5 | — | — | — | — | — | — | — | — |
| D | 0.012 | 0.21 | 0.44 | 0.015 | 0.001 | 12.2 | 4.8 | — | — | 0.021 | 0.009 | 1.2 | — | — | — | — | — | — | — | — |
| E | 0.015 | 0.19 | 0.42 | 0.015 | 0.001 | 12.7 | 5.9 | 2.4 | — | 0.019 | 0.009 | — | 0.12 | — | — | — | — | — | — | — |
| F | 0.008 | 0.08 | 0.11 | 0.012 | 0.002 | 8.5 | 1.2 | — | — | 0.021 | 0.007 | — | — | 0.25 | — | — | — | — | — | — |
| G | 0.021 | 0.25 | 0.18 | 0.015 | 0.001 | 11 | 5.5 | 2.3 | — | 0.019 | 0.005 | — | 0.05 | 0.08 | 0.03 | 0.06 | 0.11 | — | — | — |
| H | 0.011 | 0.28 | 0.58 | 0.011 | 0.001 | 12.5 | 4.7 | 0.7 | — | 0.013 | 0.010 | — | — | — | — | — | — | 0.001 | — | — |
| I | 0.015 | 0.21 | 0.21 | 0.018 | 0.001 | 12.1 | 6.3 | 1.8 | — | 0.008 | 0.12 | — | 0.11 | — | — | — | — | — | 0.002 | — |
| J | 0.009 | 0.13 | 0.36 | 0.011 | 0.001 | 11.6 | 5.8 | 2.6 | — | 0.017 | 0.008 | — | 0.08 | — | — | — | — | 0.002 | 0.005 | 0.001 |

TABLE 2

| Solution | Gas | Temperature | Test period | Testing method | Load applied |
|---|---|---|---|---|---|
| 25% NaCl | 10 atm $CO_2$ | 100° C. | 720 hours | Four-point bending test (root pass side test piece as welded) | 100% YS of the base metal |

TABLE 3

| No. | Base metal | Welding method | Backing strip in MAG | Oxygen concentration on penetration bead side (%) | Cr concentration of base metal (%) | $Cr_{depression}$[1] (%) | Occurrence of SCC |
|---|---|---|---|---|---|---|---|
| 1 | A | TIG | — | 2.1 | 9.3 | 6.8 | No |
| 2 | B | TIG | — | 2.5 | 11.9 | 8.6 | No |
| 3 | C | TIG | — | 1.2 | 12.9 | 11.7 | No |
| 4 | D | TIG | — | 1.8 | 12.2 | 12.4 | No |
| 5 | E | TIG | — | 0.3 | 12.7 | 11.9 | No |
| 6 | F | TIG | — | 1.1 | 8.5 | 6.3 | No |
| 7 | G | TIG | — | 1.8 | 11.0 | 10.1 | No |
| 8 | H | TIG | — | 2.2 | 12.5 | 10.6 | No |
| 9 | I | TIG | — | 2.1 | 12.1 | 9.9 | No |
| 10 | J | TIG | — | 0.2 | 11.6 | 10.5 | No |
| 11 | E | MAG | Cu | 0.2 | 12.7 | 8.3 | No |
| 12 | E | MAG | Cu + alumina | 20 | 12.7 | 12.1 | No |
| 13 | J | MAG | Cu + alumina | 20 | 11.6 | 10.3 | No |
| 14 | E | MAG + PWHT[2] | Cu | 20 | 12.7 | 12.2 | No |
| 15 | E | MAG | Cu | 20 | 12.7 | 2.8* | Yes |

[1]The lowest Cr concentration in the vicinity of grain boundaries in a surface layer.
[2]PWHT = Post-welding heat treatment: at 650° C. for 5 minutes.
*Outside the range defined by the present invention.

As shown in FIG. 3 and FIG. 5(b), measurement of the Cr concentration immediately below the weld oxide scale was carried out at the grain boundaries at a position 100 nm into the base metal as measured from the edge of the weld oxide scale, and the lowest value in the resulting profile was recorded as Cr concentration Examples 1–14, which are examples according to the present invention, had excellent corrosion resistance in an as-welded state, and SCC did not take place. In contrast, for Example No. 15, which was a

INDUSTRIAL APPLICABILITY

According to the present invention, it is possible to obtain a welded structure of martensitic stainless steel which does not cause SCC even when exposed to a high temperature $CO_2$ gas environment. Thus, the present invention makes it possible to form a welded joint which does not cause SCC even in an as-welded state when steel pipes such as seamless steel pipe are welded by girth welding to constitute a line pipe for transporting highly corrosive petroleum and natural gas, so the present invention has great practical significance.

The invention claimed is:

1. A welded line pipe structure comprising a martensitic stainless steel which has a steel composition consisting essentially of, in mass percent, C, 0.001–0.05%, Si: 0.05–1%, Mn: 0.05–2%, Cr: 8–16%, Ni: 0.1–9%, sol. Al: 0.001–0.1%, and a remainder of Fe and unavoidable impurities, wherein $Cr_{depletion}$, which is the lowest Cr concentration in mass percent in grain boundary Cr-depleted portions existing immediately beneath a weld oxide scale in a heat affected zone, satisfies $(Cr_{depletion}) \geq 5\%$.

2. A welded line pipe structure of martensitic stainless steel as set forth in claim 1 wherein the steel composition further consists essentially of Cu: 0.1–3%.

3. A welded line pipe structure of martensitic stainless steel as set forth in claim 2 wherein the steel composition further consists essentially of at least one element selected from the group consisting of Ti, Zr, Hf, V, and Nb in an amount of 0.005–0.5% each.

4. A welded line pipe structure of martensitic stainless steel as set forth in claim 3 wherein the steel composition further consists essentially of at least one element selected from the group consisting of Ca, Mg, and REM in an amount of 0.0005–0.01% each.

5. A welded line pipe structure of martensitic stainless steel as set forth in claim 2 wherein the steel composition further consists essentially of at least one element selected from the group consisting of Ca, Mg, and REM in an amount of 0.0005–0.01% each.

6. A welded line pipe structure of martensitic stainless steel as set forth in claim 1 wherein the steel composition further consists essentially of at least one element selected from the group consisting of Ti, Zr, Hf, V, and Nb in an amount of 0.005–0.5% each.

7. A welded line pipe structure of martensitic stainless steel as set forth in claim 6 wherein the steel composition further consists essentially of at least one element selected from the group consisting of Ca, Mg, and REM in an amount of 0.0005–0.01% each.

8. A welded line pipe structure of martensitic stainless steel as set forth in claim 1 wherein the steel composition further consists essentially of at least one element selected from the group consisting of Ca, Mg, and REM in an amount of 0.0005–0.01% each.

9. A welded line pipe structure of martensitic stainless steel as set forth in claim 1 wherein the steel composition further consists essentially of Mo: 0.1–7%, and/or W: 0.1–7%.

10. A welded line pipe structure of martensitic stainless steel as set forth in claim 9 wherein the steel composition further consists essentially of Cu: 0.1–3%.

11. A welded line pipe structure of martensitic stainless steel as set forth in claim 10 wherein the steel composition further consists essentially of at least one element selected from the group consisting of Ti, Zr, Hf, V, and Nb in an amount of 0.005–0.5% each.

12. A welded line pipe structure of martensitic stainless steel as set forth in claim 11 wherein the steel composition further consists essentially of at least one element selected from the group consisting of Ca, Mg, and REM in an amount of 0.0005–0.01% each.

13. A welded line pipe structure of martensitic stainless steel as set forth in claim 10 wherein the steel composition further consists essentially of at least one element selected from the group consisting of Ca, Mg, and REM in an amount of 0.0005–0.01% each.

14. A welded line pipe structure of martensitic stainless steel as set forth in claim 9 wherein the steel composition further consists essentially of at least one element selected from the group consisting of Ti, Zr, Hf, V, and Nb in an amount of 0.005–0.5% each.

15. A welded line pipe structure of martensitic stainless steel as set forth in claim 14 wherein the steel composition further consists essentially of at least one element selected from the group consisting of Ca, Mg, and REM in an amount of 0.0005–0.01% each.

16. A welded line pipe structure of martensitic stainless steel as set forth in claim 9 wherein the steel composition further consists essentially of at least one element selected from the group consisting of Ca, Mg, and REM in an amount of 0.0005–0.01% each.

* * * * *